US007188698B1

(12) United States Patent
Schneider

(10) Patent No.: US 7,188,698 B1
(45) Date of Patent: Mar. 13, 2007

(54) CONTROL KNOB THROTTLE MODULATION

(75) Inventor: William D. Schneider, Malcolm, NE (US)

(73) Assignee: Glazer Enterprises, Inc.

( * ) Notice: Subject to any disclaimer, the term of this patent is extended or adjusted under 35 U.S.C. 154(b) by 374 days.

(21) Appl. No.: 10/924,063

(22) Filed: Aug. 23, 2004

(51) Int. Cl.
*B60K 26/00* (2006.01)

(52) U.S. Cl. .......................................................... 180/315

(58) Field of Classification Search ................ 180/315, 180/316, 323, 325
See application file for complete search history.

(56) References Cited

U.S. PATENT DOCUMENTS 6,932,183 B2 * 8/2005 Jeppe et al. ................ 180/333

* cited by examiner

*Primary Examiner*—Faye M. Fleming
(74) *Attorney, Agent, or Firm*—Thomte, Mazour & Niebergall; Dennis L. Thomte

(57) ABSTRACT

A control knob throttle modulation system for a truck-mounted aerial device such as a boom truck or the like wherein the speed of the truck engine is controlled by a switch button positioned in a control knob located at the operator's station rather than by a foot pedal which frees up the foot pedal to be used for other crane operations or to eliminate the same.

4 Claims, 2 Drawing Sheets

CONTROL KNOB THROTTLE MODULATION

BACKGROUND OF THE INVENTION

1. Field of the Invention

This invention relates to a control knob throttle modulation and more particularly to a control knob throttle modulation which is designed to be used with a truck-mounted aerial device such as a telescoping work platform, boom, crane, digger, concrete pumper, etc. More particularly, the invention relates to a control knob throttle modulation which enables the operator of a boom truck or the like to vary the engine speed of the truck so that the hydraulic pump associated therewith may provide sufficient hydraulic fluid to the various cylinders, hydraulic motors, etc., of the device. Further, the instant invention enables the customary remote mounted foot throttle to be utilized for other crane operations.

2. Description of the Related Art

Truck-mounted aerial devices such as cranes, booms, diggers, etc., include a hydraulic pump which is operated by the engine of the truck. If the engine of the truck is idling, the hydraulic pump is not sufficiently powered to supply the necessary hydraulic fluid to the various cylinders or motors. Therefore, it is necessary for the engine speed to be increased when crane operations are being conducted. Heretofore, the truck-mounted aerial devices sometimes included an operator's station wherein a foot pedal, much like an accelerator pedal or foot feed pedal, is utilized to increase the speed of the truck engine. The foot pedal of such aerial devices is normally electronically connected to the engine speed control.

SUMMARY OF THE INVENTION

A control knob throttle modulation mechanism is provided for a truck-mounted aerial device such as a boom truck which includes an engine, having an engine speed modulation system, which is operatively connected to a hydraulic pump for supplying hydraulic fluid to various hydraulic cylinders or hydraulic motors associated therewith. An operator's station is provided on the boom truck and normally includes a foot pedal much like an accelerator pedal of a conventional vehicle. The foot pedal is normally connected to the engine speed modulation system. An engine control throttle modulation knob is located at the operator's station which is operatively connected to the engine speed modulation mechanism to enable the control knob to selectively vary the speed of the truck engine. The control knob of this invention enables the conventional foot operated pedal to be either eliminated or to permit the same to allow other crane operations to be foot modulated.

It is therefore a principal object of the invention to provide an improved mechanism for controlling the speed of the engine of a truck-mounted aerial device.

Still another object of the invention is to provide a control knob throttle modulation mechanism for controlling the speed of the engine of a truck-mounted aerial device such as a crane, boom, digger, etc.

Yet another object of the invention is to provide a control knob throttle modulation mechanism for a truck-mounted aerial device which may be added to conventional aerial devices without extensive modification thereof.

Still another object of the invention is to provide a control knob throttle modulation mechanism for a truck-mounted aerial device which is conveniently operated and which is reliable in operation.

These and other objects will be apparent to those skilled in the art.

DETAILED DESCRIPTION OF THE INVENTION

Figure 1:
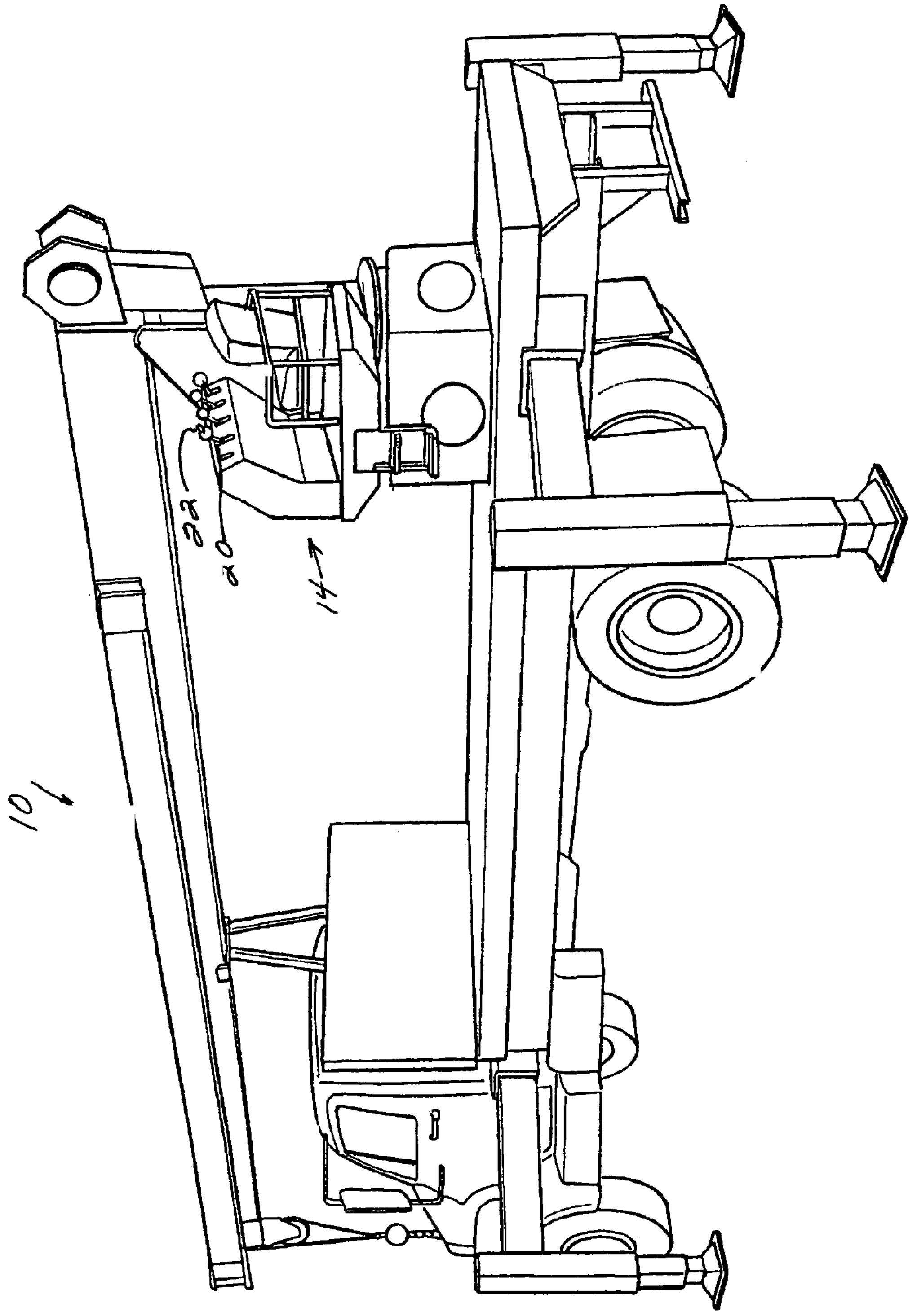
FIG. 1 is a rear perspective view of a conventional truck-mounted aerial device which has the control knob throttle modulation mechanism of this invention mounted thereon.
Figure 2:
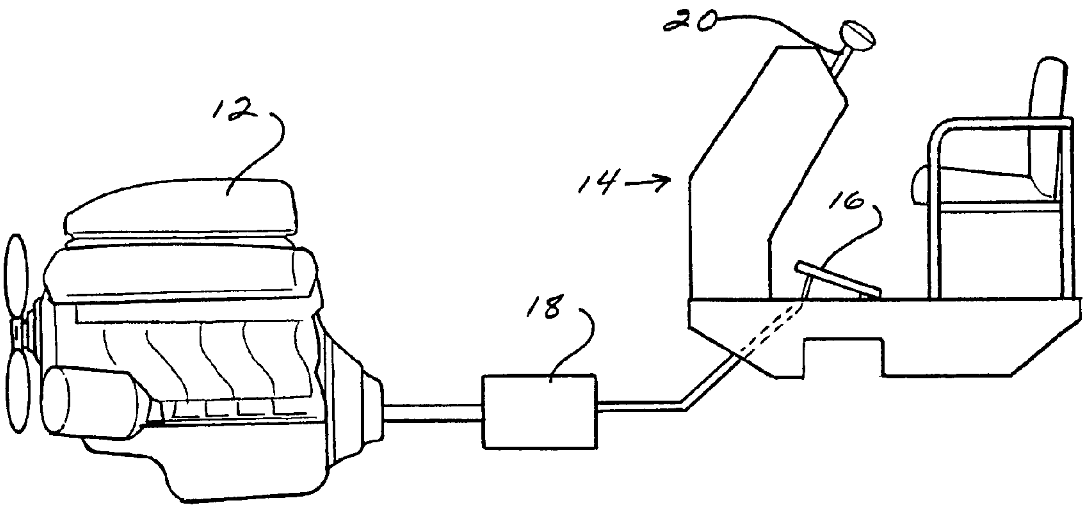
FIG. 2 (PRIOR ART)
FIG. 2 is a schematic illustrating the manner in which the conventional foot pedal is connected to the engine speed modulation system.
Figure 3:
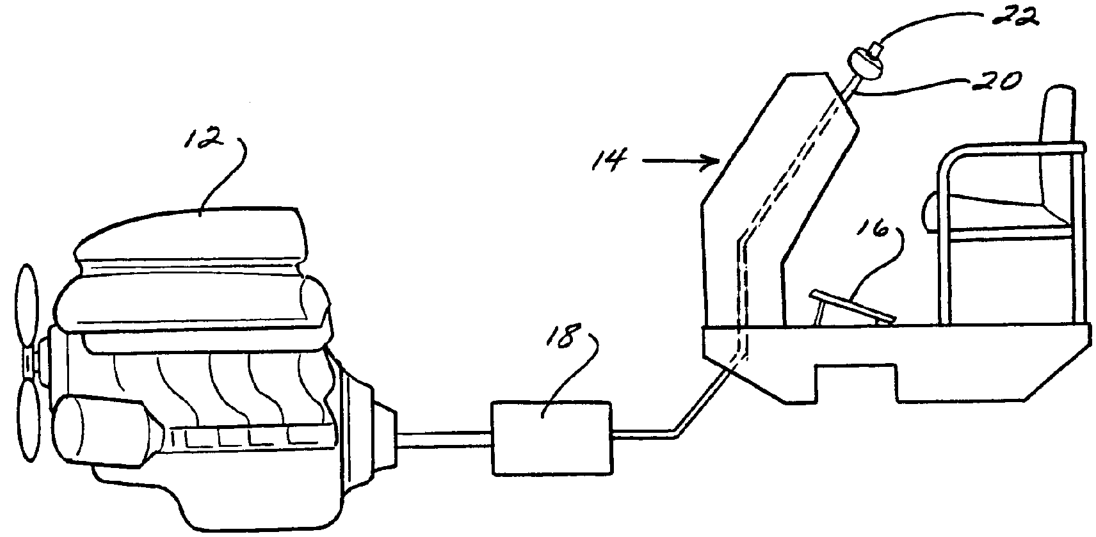
FIG. 3 is a view similar to FIG. 2 except that the control knob throttle modulation mechanism of this invention is illustrated.

The numeral 10 refers generally to a truck-mounted aerial device such as a boom truck, crane, digger, etc. The truck-mounted aerial device 10 includes a truck engine 12 which is operatively connected to a hydraulic pump which is operatively connected to the hydraulic cylinders and hydraulic motors of the aerial device. In the prior art devices, the aerial device 10 is provided with an operator's station 14 which includes a foot pedal 16 which is hard-wired or otherwise connected to the throttle modulation system 18 for the truck engine 12 to control and vary the speed of the truck engine. FIG. 2 illustrates the prior art method by which the foot pedal 16 is connected to the engine speed modulation system 18. FIG. 3 illustrates the invention of this application.

In the instant invention, the operator's station 14 may still have the foot pedal 20 but if the same is provided it is connected to other components for crane operations. The operator's station has a plurality of control levers which are referred to by the reference numeral 20 and which are movably operated to achieve various crane operations. In one of the control levers 20, a manually operated throttle control knob or switch button 22 is provided. The switch button 22 is operatively electrically connected to the engine speed modulation system 18 so that the boom operator may control the engine speed by simply depressing switch button 22. The switch button 22 may be manipulated to increase or decrease the truck engine RPM with a single touch thereon.

Thus, with the instant invention, the operator who is located at the operator's station 14 may control the speed (RPM) of the engine of the truck 10 by use of the throttle control knob or switch button 22 so that sufficient hydraulic fluid will be supplied to the hydraulic pump of the aerial device 10. The foot pedal 16, if utilized, may be operated to control other crane operations.

The provision of the throttle control knob or switch button 22 not only enables the foot pedal 16 to be used to control other crane operations, but permits the foot pedal 16 to be eliminated entirely.

Thus it can be seen that a novel control knob throttle modulation mechanism has been provided which enables the engine speed of a truck-mounted aerial device to be remotely controlled without the use of conventional foot pedal mechanisms.

Thus it can be seen that the invention accomplishes at least all of its stated objectives.

I claim:

1. In combination:

a truck-mounted aerial device including a cab and an engine including an engine speed modulation mechanism which is operatively connected to the engine for varying the speed thereof without moving the truck;

said truck-mounted aerial device also including an operator's station positioned remote from the truck cab;

an engine control knob located at said operator's station which is operatively connected to the engine speed modulation mechanism to enable said control knob to selectively vary the speed of the engine.

2. The combination of claim 1 wherein said operator's station also includes a foot pedal which controls the operation of other boom truck operations.

3. The combination of claim 1 wherein said engine control knob is mounted on an operating lever.

4. The combination of claim 3 wherein said control knob includes a switch button in said engine control knob.

* * * * *